(12) United States Patent
Pelski

(10) Patent No.: US 12,051,319 B2
(45) Date of Patent: Jul. 30, 2024

(54) ASSURANCE SERVICES SYSTEM AND METHOD

(71) Applicant: Tyco Fire & Security GmbH, Neuhausen am Rheinfall (CH)

(72) Inventor: Jason Pelski, Boca Raton, FL (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/566,252

(22) Filed: Dec. 30, 2021

(65) Prior Publication Data

US 2022/0238009 A1 Jul. 28, 2022

Related U.S. Application Data

(63) Continuation of application No. 16/682,679, filed on Nov. 13, 2019, now Pat. No. 11,217,087.

(60) Provisional application No. 62/767,356, filed on Nov. 14, 2018.

(51) Int. Cl.
*G08B 29/18* (2006.01)
*G08B 5/22* (2006.01)
*H04N 7/18* (2006.01)

(52) U.S. Cl.
CPC ............ *G08B 29/18* (2013.01); *G08B 5/22* (2013.01); *H04N 7/181* (2013.01)

(58) Field of Classification Search
CPC .......... G08B 29/18; G08B 5/22; H04N 7/181
USPC ...................................................... 340/506
See application file for complete search history.

(56) References Cited

U.S. PATENT DOCUMENTS

| 10,289,107 | B2* | 5/2019 | Warner | G05B 23/0208 |
|---|---|---|---|---|
| 10,417,451 | B2 | 9/2019 | Park et al. | |
| 10,459,593 | B2* | 10/2019 | Tiwari | G08B 13/04 |
| 10,798,538 | B2* | 10/2020 | Jain | G06V 20/52 |
| 2003/0093521 | A1* | 5/2003 | Schlonski | H04L 41/22 709/224 |
| 2003/0225707 | A1* | 12/2003 | Ehrman | H04L 9/40 705/64 |
| 2004/0117046 | A1* | 6/2004 | Colle | G06Q 10/06 700/99 |
| 2006/0229848 | A1* | 10/2006 | Armstrong | G05B 23/0286 702/184 |
| 2008/0086509 | A1* | 4/2008 | Wallace | G06F 16/285 |
| 2010/0097940 | A1* | 4/2010 | Asefa | H04L 43/50 370/245 |
| 2011/0298629 | A1* | 12/2011 | Wilson | G06Q 10/20 340/679 |

(Continued)

*Primary Examiner* — Zhen Y Wu
(74) *Attorney, Agent, or Firm* — Foley & Lardner LLP

(57) ABSTRACT

A security assurance system for a building including one or more security assets includes one or more memory devices having instructions stored thereon that, when executed by one or more processors, cause the one or more processors to perform operations including receiving first data indicating a layout of the building, receiving second data indicating a location of the one or more security assets within the building, generating location data for the one or more security assets indicating the location of the one or more security assets within the layout of the building, monitoring a status including at least one of a health, a service status, or a regulatory compliance of the one or more security assets, and presenting, via a user interface, the location data of the one or more security assets.

20 Claims, 10 Drawing Sheets

(56) References Cited

U.S. PATENT DOCUMENTS

| | | | |
|---|---|---|---|
| 2012/0254048 A1* | 10/2012 | Roberts | G06Q 10/0637 |
| | | | 705/317 |
| 2012/0326864 A1* | 12/2012 | Kelsey | H02J 13/00017 |
| | | | 340/539.11 |
| 2014/0215630 A1* | 7/2014 | Raz | H04L 63/1433 |
| | | | 726/25 |
| 2014/0330685 A1* | 11/2014 | Nazzari | G06Q 10/083 |
| | | | 705/28 |
| 2015/0095090 A1* | 4/2015 | Altieri | G06Q 10/06313 |
| | | | 705/7.23 |
| 2015/0120359 A1* | 4/2015 | Dongieux | G06F 16/285 |
| | | | 705/7.15 |
| 2015/0146239 A1* | 5/2015 | Anderson | H04W 4/021 |
| | | | 358/1.15 |
| 2015/0156342 A1* | 6/2015 | Fries | B42D 15/00 |
| | | | 358/1.15 |
| 2015/0229626 A1* | 8/2015 | Hauhn | H04L 63/107 |
| | | | 726/4 |
| 2016/0071398 A1* | 3/2016 | Boss | G08B 23/00 |
| | | | 340/686.6 |
| 2016/0217433 A1* | 7/2016 | Walton | H04L 63/101 |
| 2017/0019264 A1* | 1/2017 | Nugent | H04L 67/52 |
| 2017/0249642 A1* | 8/2017 | Burpulis | G06Q 30/018 |
| 2017/0353353 A1* | 12/2017 | Nicholas | H04L 41/0803 |
| 2018/0011461 A1* | 1/2018 | Camarasa | G08B 25/10 |
| 2018/0067593 A1* | 3/2018 | Tiwari | G08B 13/22 |
| 2018/0096568 A1* | 4/2018 | Cohn | H04L 12/2827 |
| 2018/0249298 A1* | 8/2018 | Jain | G06V 20/36 |
| 2019/0019090 A1* | 1/2019 | Chacko | G06Q 10/103 |
| 2019/0095644 A1 | 3/2019 | Park et al. | |
| 2019/0354921 A1* | 11/2019 | Bolta | H04W 4/33 |

\* cited by examiner

Buildings

Buildings availaling space conversion

🔍 Filter building by name

| Building name [702] | Location [704] | Address [706] | Floors [708] | Status [710] |
|---|---|---|---|---|
| Building 30 | Pune | A-15, MIDC Technology Park. Talawade, Pune, 411 062 India | 5 | ▓▓▓ ··· |
| Building 43 | Seattle | 113 Cherry St, Seattle, WA, 98124 | 8 | ▓▓▓ ··· |
| Building C | Chicago | 1060 West Addison STreet, Chicago, IL 60613 | 2 | ▒▒ ··· |
| Building 39 | London | 1 London Bridge Street, London SE1 9GF, UK | 12 | ▓▓▓ ··· |
| Building 72 | Beijing | 126-1 Lianhuachi E Rd, Fengtai Qu, Beijing Shi, China, 100036 | 9 | ▒▒ ··· |
| Building 11 | Columbia | Cl,30 #13C-07, Barranquilla, Atlántico, Columbia | 3 | ▒ ··· |
| Building 5 | Israel | HaYarkon St 71, Tel Aviv-Yafo, Israel | 5 | ▒ ··· |
| Building 122 | Vancouver | 1075 W Pender St, Vancouver, BC V6E 2M6, Canada | 2 | ▒ ··· |
| Building A | Shenzhen | Bao'an, Shenzhen, Guangdong, China | 11 | ▒ ··· |
| Building 88 | Singapore | 320 Orchard Rd, Singapore 238865 | 3 | ▒ ··· |

◯ Workflow created, no files uploaded
◯ Files uploaded
▒ File conversion complete
▓ Files approved for use Create New Building Items per page: 10 ▼    1-10 of 18  ›

FIG. 7

ASSURANCE SERVICES SYSTEM AND METHOD

CROSS-REFERENCE TO RELATED PATENT APPLICATIONS

The present application is a continuation of and claims priority to U.S. patent application Ser. No. 16/682,679, entitled "ASSURANCE SERVICES SYSTEM AND METHOD," filed on Nov. 13, 2019, which itself claims priority to and the benefit of U.S. Provisional Application No. 62/767,356, filed Nov. 14, 2018, the contents of each of which are incorporated herein by reference in their entirety for all purposes.

BACKGROUND

The present disclosure relates generally to building systems that operate a building. The present disclosure relates more particularly to management of security devices within building systems.

Commercial security systems protect people and property within and outside of a building. The property protected by commercial security systems include not only physical property but digital property as well, keeping data secure from hacking and other cyber threats. To ensure that a commercial security system is protecting all people and property effectively, the security system must be continuously monitored, updated, upgraded to comply with complex regulatory requirements. With the speed and effectiveness of security threats increasing, many security systems fall short of effective security incident prevention. An improved security system is needed that can be more effectively monitored, updated, and upgraded to comply with regulatory requirements.

SUMMARY

One implementation of the present disclosure is a security assurance system for a building including one or more security assets. The system includes one or more memory devices having instructions stored thereon that, when executed by one or more processors, cause the one or more processors to perform operations including receiving first data indicating a layout of the building, receiving second data indicating a location of the one or more security assets within the building, generating location data for the one or more security assets indicating the location of the one or more security assets within the layout of the building, monitoring a status of the one or more security assets, and presenting, via a user interface, the location data of the one or more security assets. The status comprising at least one of a health, a service status, or a regulatory compliance of the one or more security assets.

In some embodiments, the first data is a digital model of the layout of the building and the second data is received in response to a user scanning asset identification tags associated with the one or more security assets.

In some embodiments, the location data of the one or more security assets are presented via the user interface within the digital model of the layout of the building.

In some embodiments, the operations include determining whether to perform a service action for a first security asset of the one or more security assets based on the status of the first security asset and generating a work order for the first security asset based on a determination to perform the service action.

In some embodiments, the determination to perform the service action is based on the status of the first security asset indicating at least one of the first security asset requires routine maintenance, the first security assets meets a predefined condition indicating that a service rule has been broken, or the first security asset is not in compliance with regulatory standards.

In some embodiments, the operations include receiving third data indicating an updated layout of the building, receiving fourth data indicating a location of the one or more security assets within the updated layout of the building, generating updated location data for the one or more security assets indicating the location of the one or more security assets within the updated layout of the building, and presenting, via the user interface, the updated location data of the one or more security assets.

In some embodiments, the operations further comprising presenting, via the user interface, at least one of an asset monitoring dashboard indicating the status of the one or more security assets, an asset service dashboard indicating a total number of service events associated with the one or more security assets and a status of the service events, or an asset compliance dashboard indicating a regulatory compliance status of the one or more security assets.

Another implementation of the present disclosure is a method. The method includes receiving first data indicating a layout of a building, receiving second data indicating a location of one or more security assets within the building, generating location data for the one or more security assets indicating the location of the one or more security assets within the layout of the building, monitoring a status of the one or more security assets, and presenting, via a user interface, the location data of the one or more security assets. The status comprising at least one of a health, a service status, or a regulatory compliance of the one or more security assets.

In some embodiments, the first data is a digital model of the layout of the building and the second data is received in response to a user scanning asset tags identification associated with the one or more security assets.

In some embodiments, the location data of the one or more security assets are presented via the user interface within the digital model of the layout of the building.

In some embodiments, the method further includes determining whether to perform a service action for a first security asset of the one or more security assets based on the status of the first security asset and generating a work order for the first security asset based on a determination to perform the service action.

In some embodiments, the determination to perform the service action is based on the status of the first security asset indicating at least one of the first security asset requires routine maintenance, the first security assets meets a predefined condition indicating that a service rule has been broken, or the first security asset is not in compliance with regulatory standards.

In some embodiments, the method further includes receiving third data indicating an updated layout of the building, receiving fourth data indicating a location of the one or more security assets within the updated layout of the building, generating updated location data for the one or more security assets indicating the location of the one or more security assets within the updated layout of the building, and presenting, via the user interface, the updated location data of the one or more security assets.

In some embodiments, the method further includes presenting, via the user interface, at least one of an asset monitoring dashboard indicating the status of the one or more security assets, an asset service dashboard indicating a total number of service events associated with the one or more security assets and a status of the service events, or an asset compliance dashboard indicating a regulatory compliance status of the one or more security assets.

Yet another implementation of the present disclosure is a security assurance manager for a building including one or more processing circuits. The one or more processing circuits are configured to receive first data indicating a layout of the building, wherein the first data is a digital model of the layout of the building, receive second data indicating a location of one or more security assets within the building, generate location data for the one or more security assets indicating the location of the one or more security assets within the layout of the building, monitor a status of the one or more security assets, and present, via a user interface, the location data of the one or more security assets within the digital model of the layout of the building. The status comprising at least one of a health, a service status, or a regulatory compliance of the one or more security assets.

In some embodiments, the second data indicating the location of the one or more security assets within the building is received in response to a user scanning asset tags associated with the one or more security assets.

In some embodiments, the one or more processors configured to determine whether to perform a service action for a first security asset of the one or more security assets based on the status of the first security asset and generate a work order for the first security asset based on a determination to perform the service action.

In some embodiments, the determination to perform the service action is based on the status of the first security asset indicating at least one of the first security asset requires routine maintenance, the first security assets meets a predefined condition indicating that a service rule has been broken, or the first security asset is not in compliance with regulatory standards.

In some embodiments, the one or more processors are configured to receive third data indicating an updated layout of the building, receive fourth data indicating a location of the one or more security assets within the updated layout of the building, generate updated location data for the one or more security assets indicating the location of the one or more security assets within the updated layout of the building, and present, via the user interface.

In some embodiments, the one or more processors are configured to present, via the user interface, at least one of an asset monitoring dashboard indicating the status of the one or more security assets, an asset service dashboard indicating a total number of service events associated with the one or more security assets and a status of the service events, or an asset compliance dashboard indicating a regulatory compliance status of the one or more security assets.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is an example user interface illustrating the space converter of FIG. 6, according to some embodiments.

DETAILED DESCRIPTION

Overview

The present disclosure relates to systems and methods for implementing a security assurance system within a building. Referring generally to the FIGURES, systems and methods for implementing a security assurance system that can be continuously monitored, updated, and upgraded to comply with regulatory requirements is shown, according to an exemplary embodiment. With threats to security to both physical and electronic property becoming commonplace, it is difficult for security systems to keep up. Security systems may fall behind in monitoring activity, maintaining security devices, and entering work orders for security device repair. In addition, regulatory initiatives regarding security systems are updated and modified on a regular bases, making it difficult for security systems to remain in compliance. Furthermore, when new or different security devices are installed in a security system, it may be difficult to integrate the new or different security device into the existing security system.

The assurance services system and method described herein are configured to continuously monitor activity, maintain security devices, enter work orders for security devices, and maintain compliance with regulatory initiatives, in some embodiments. Security assets are tagged and entered into the assurance services system through a user interface, and a user can place the security assets on a digital layout (e.g., floor plan, model) of a building. The assurance services system can then monitor various aspects of the security assets. These aspects may include the monitoring status of the security asset, the maintenance status of the security asset, and the regulatory compliance status of the security asset. The assurance services system is also configured to provide for updates to a digital layout of a building, including adding or removing different security assets within the digital layout.

Building with Building Systems

Figure 1:
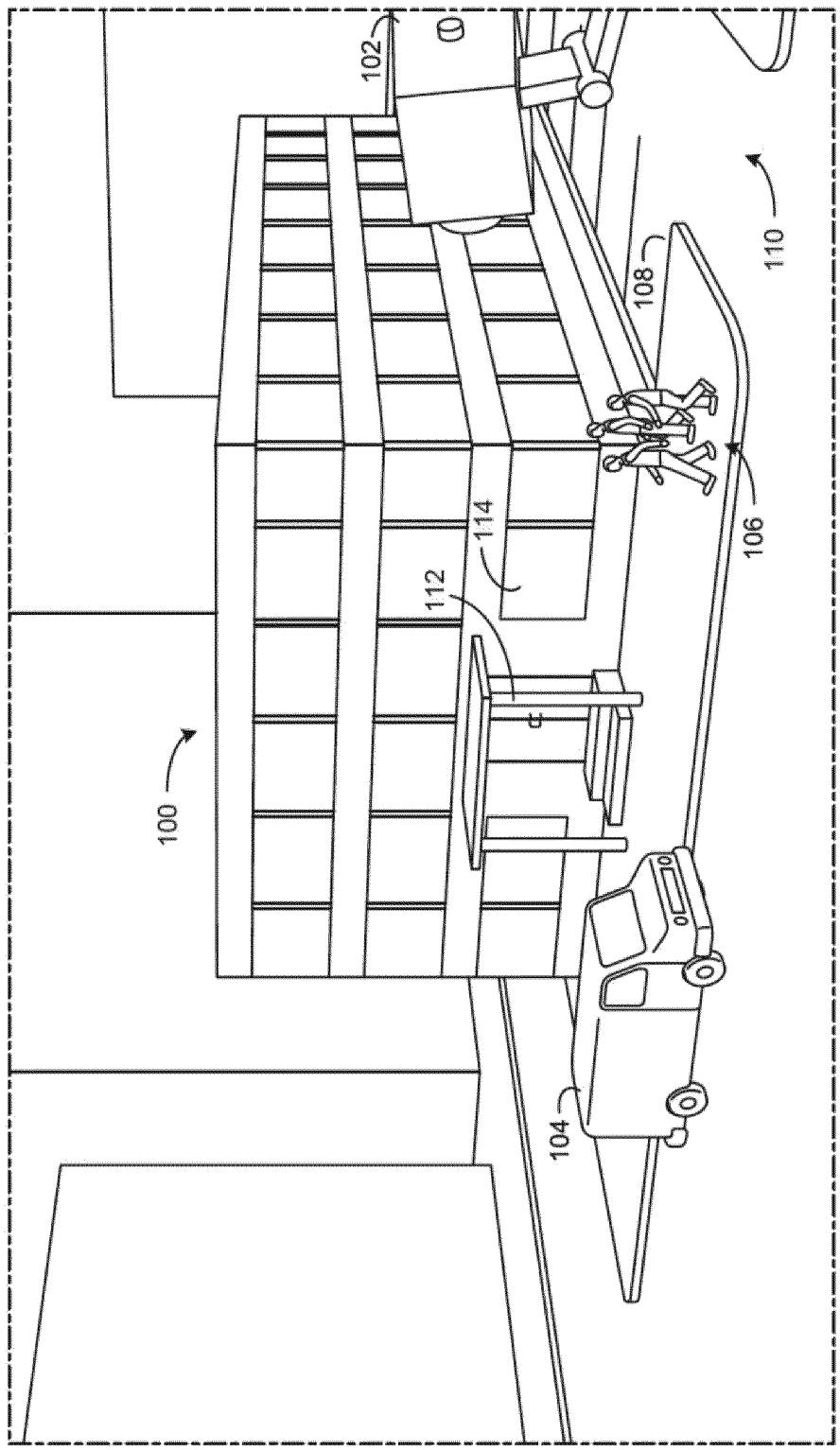
FIG. 1 is a perspective view schematic drawing of a building with building systems, according to some embodiments.

Referring now to FIG. 1, a building 100 with a security camera 102 and a parking lot 110 is shown, according to some embodiments. In some embodiments, building 100 is a single or multi-story commercial or residential building surrounded by, or located near, parking lot 110. Building 100 may be a school, a hospital, a store, a place of business, a residence, an apartment complex, a hotel, an office building, etc., for example, and may be generally associated with parking lot 110. In some embodiments, building 100 may be one of many buildings belonging to a single industrial park, shopping mall, or commercial park having a common parking lot and security camera 102. In some embodiments, building 100 may be a residential building or multiple residential buildings that share a common roadway or parking lot.

Building 100 and parking lot 110 may be at least partially in a field of view of security camera 102. In some embodiments, multiple security cameras (e.g., multiple of security camera 102) may be used to capture areas of building 100 and parking lot 110 not in the field of view of security camera 102. In some embodiments, multiple security cameras (e.g., multiple of security camera 102) may be used to create overlapping areas within a single field of view. Parking lot 110 may be used by one or more stationary or moving vehicles 104 (e.g. delivery vehicles). Building 100 and parking lot 110 may also be used by one or more pedestrians 106, who may traverse parking lot 110 and/or enter and/or exit building 100. Building 100 may be further surrounded, either wholly or partially, by a sidewalk 108. Sidewalk 108 may facilitate foot traffic of the one or more pedestrians 106.

Building 100 is shown to include a door 112 and one or more windows 114. An access control system can be implemented within building 100 to secure these and other potential entranceways of building 100. For example, badge readers can be positioned outside of door 112 to restrict access to building 100. One or more of pedestrians 106 can be associated with access badges, operable to gain access to building 100 through door 112 (e.g., by swiping an access badge through the badge reader). In some embodiments, interior doors within building 100 can include access readers. In some embodiments, doors (e.g., door 112, other doors within building 100) may be secured through biometric information, for example, facial recognition, fingerprint scanners, etc. Furthermore, the assurance services system can generate events, for example, an indication that a particular user (e.g., with a particular identification badge) has interacted with a badge reader associated with a door. In another example where door 112 is forced open, the assurance services system may generate a door forced open (DFO) event based on data from a door sensor.

In some embodiments, one or more of windows 114 are secured by the assurance services system via burglar alarm sensors. Burglar alarm sensors can be configured to measure vibrations associated with one of the windows 114, for example. If vibration patterns or levels are sensed by the burglar alarm sensor associated with a particular one of the windows 114, a burglar alarm can may be generated by the assurance services system, indicating an intrusion at the particular one of the windows 114.

Building 100 can further include heating, ventilation, and air conditioning (HVAC) systems. For example, building 100 may including HVAC systems such as waterside systems, airside systems, building management systems, and/or various other HVAC systems. The HVAC systems of building 100 may include equipment such as chillers, boilers, rooftop units, air handler units, thermostats, sensors, actuators, dampers, valves, and other equipment operable to control one or more environmental conditions of building 100. HVAC systems and equipment that may be included in building 100 are further described in U.S. patent application Ser. No. 16/048,052, filed Jul. 27, 2018, the entirety of which is incorporated by reference herein.

Figure 2:
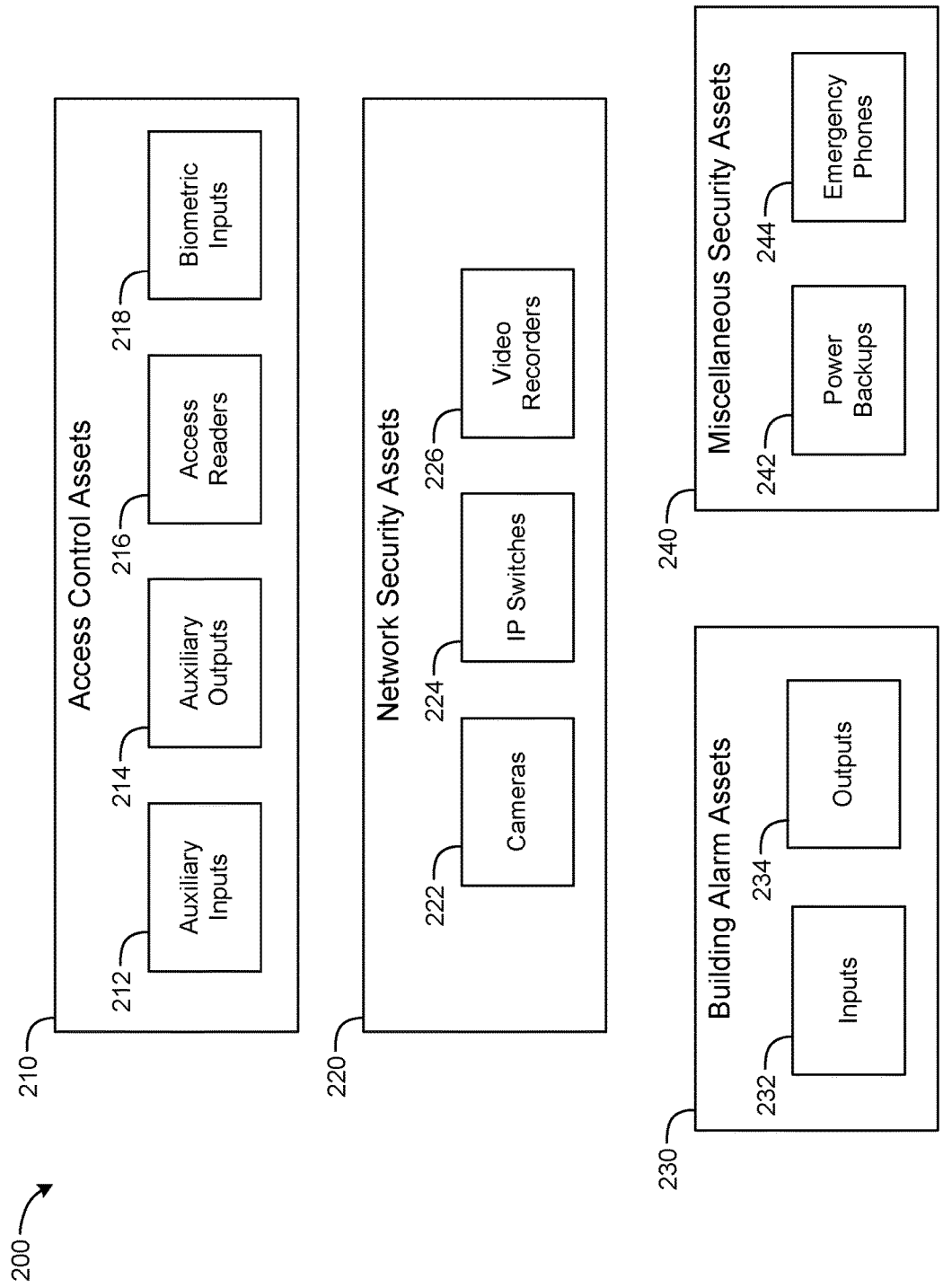
FIG. 2 is a block diagram of various building security assets within a building system, according to some embodiments.

Referring now to FIG. 2, a block diagram of various building security assets within a building security system 200 is shown, according to an exemplary embodiment. Building security system 200 may include various security assets, including access control assets 210, network security assets 220, building alarm assets 230, and miscellaneous security assets 240.

Access control assets 210 may include any security asset that controls or monitors access into a building serviced by building security system 200, such as building 100. Access control assets 210 is shown to include auxiliary inputs 212, auxiliary outputs 214, access readers 216, and biometric inputs 218. Auxiliary inputs 212 may include tamper switches, infrared sensors, temperature sensors, heat/humidity sensors, duress buttons, or any other type of input that may indicate, to building security system 200, activity occurring within or near building 100. Auxiliary outputs 214 may include sirens, strobes, door locks, door releases, or any other type of output that may notify individuals in an area of building 100 that a security breach occurred. Access readers 216 may include card readers, speed gate readers, or any other type of reader that may allow a user to access building 100 or secured areas of building 100. For example, the user may scan an identification badge, radio-frequency identification (RFID) device, or other type of identification device, or enter a code into a number pad. Biometric inputs 218 may include fingerprint scanning, retina scanning, or any other type of biometric scan that can positively identify an individual to provide access to building 100 or secured areas of building 100. Each of the access control assets 210 may include one or more components (e.g., one or more sensors, sirens, card readers, etc.) to form a complete security system.

Network security assets 220 may include any security asset that provides for security of electronic information or data for a building serviced by building security system 200, such as building 100. Network security assets 220 is shown to include cameras 222, IP switches 224, and video recorders 226. Cameras 222 may be video cameras, thermal cameras, audio-video recording devices, or other devices used to determine activity in or around building 100. IP switches 224 may be any network device operable to direct network traffic depending on a threat level associated with the network traffic. Video recorders 226 may be any digital recording devices that can record video or audio feeds from one or more of cameras 222 and store the associated data for a specified period of time. Each of the network security assets 220 may include one or more components (e.g., cameras, IP switches, video recorders, etc.) to form a complete security system.

Building alarm assets 230 may include any security asset that a notification (i.e., an alert, an alarm) of a security breach of a building serviced by building security system 200, such as building 100. Building alarm assets 230 is shown to include inputs 232 and outputs 234. Inputs 232 may include numerical keypads, biometric keypads, or any other type of device that allows a user to arm a security system. Outputs 234 may include sirens, strobes, or any other type of output that may notify a security team and/or occupants of building 100 that a security breach or other security event has occurred. Each of the building alarm assets 230 may include one or more components (e.g., keypads, sirens, etc.) to form a complete security system.

Miscellaneous security assets 240 may be any other type of security asset that enhances or provides security for a building serviced by building security system 200, such as building 100. Miscellaneous security assets 240 is shown to include power backups 242 and emergency phones 244. Power backups 242 may include backup generators, emergency power systems, backup battery systems (e.g., universal power supplies (UPS)), and any other device operable to provide emergency power in the event of power loss to building 100. Emergency phones 244 may include phones, signals, or any other type of device that can contact or notify a security team, facility manager, and/or emergency service personnel. For example, a signal device may alert a security team to the location of an individual that activated the signal device, within or outside of building 100.

Security Assurance System

Figure 3:
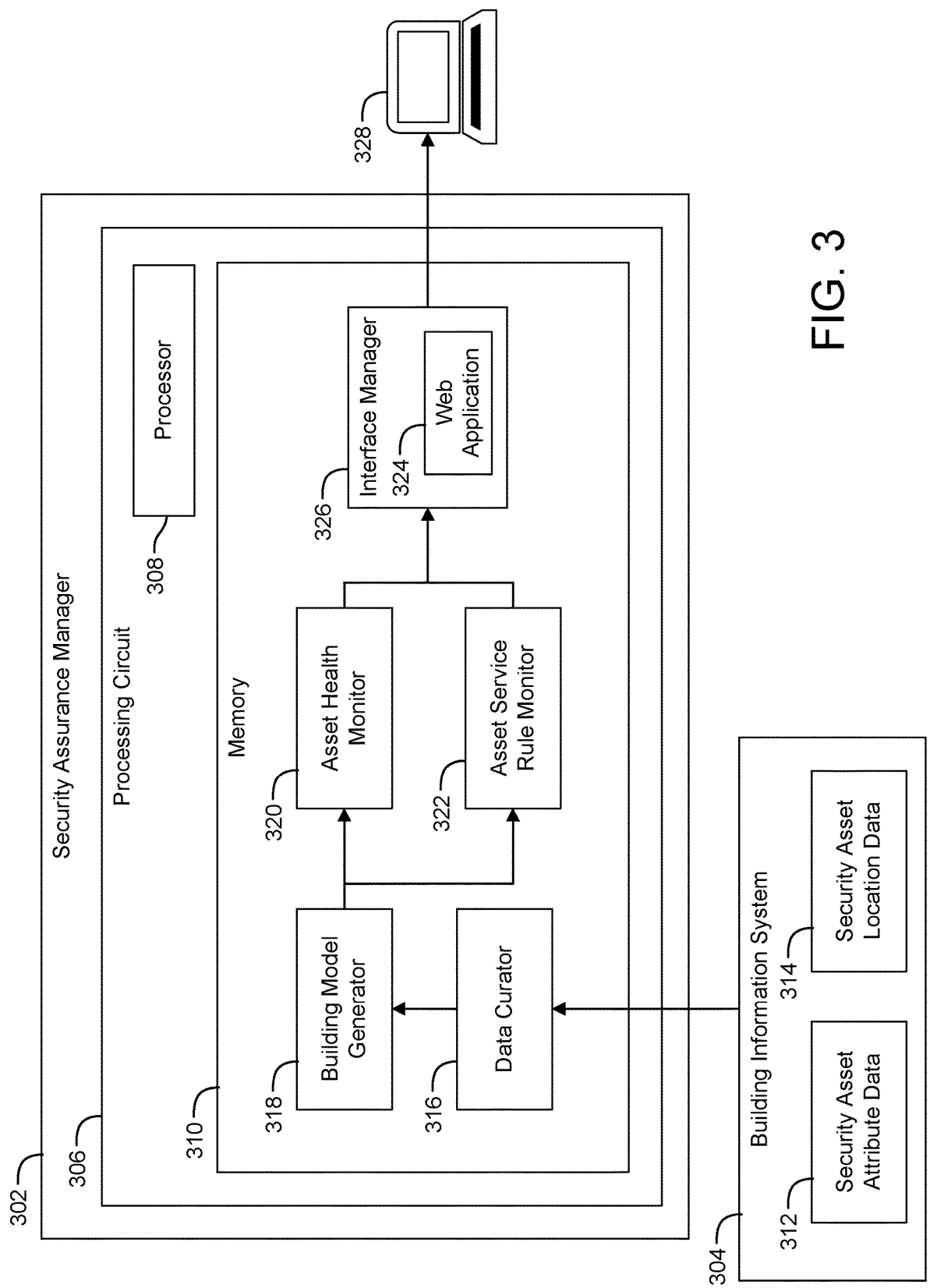
FIG. 3 is a general block diagram of a security assurance system that may be implemented in the building illustrated in FIG. 1, according to some embodiments.

Referring now to FIG. 3, a security assurance manager 302 is shown, according to some embodiments. Security assurance manager 302 is shown to include a processing circuit 306. Processing circuit 306 includes a processor 308 and a memory 310. Security assurance manager 302 can be implemented locally (e.g., within building 100) and/or remotely (e.g., outside of building 100, via a cloud network). The security assurance manager 302 can be implemented in a server, multiple servers, a cloud computing platform (e.g., Microsoft Azure, Amazon Web Service (AWS), etc.), a controller, via micro-services across multiple computing devices, and/or on (or distributed across) any other computing device or system. In some embodiments, security assurance manager 302 is implemented via the processing circuit 306 and/or implemented across of multiple processing circuits (e.g., including multiple of processor 308 and/or memory 310).

In some embodiments, processor 308 is a general purpose processor, an application specific integrated circuit (ASIC), one or more field programmable gate arrays (FPGAs), a group of processing components, or other suitable electronic processing components. Processor 308 can be communicatively coupled to memory 310. Memory 310 can include one or more devices (e.g., memory units, memory devices, storage devices, etc.) for storing data and/or instructions for completing and/or facilitating the various processes described in the present disclosure. Memory 310 may include random access memory (RAM), read-only memory (ROM), hard drive storage, temporary storage, non-volatile memory, flash memory, optical memory, or any other suitable memory for storing data (e.g., software objects, instructions, etc.). Memory 310 may include database components, object code components, script components, or any other type of information structure for supporting the various activities and information structures described in the present disclosure. Memory 310 may be communicably connected to processor 308 via processing circuit 306 and may include computer code for executing (e.g., by processor 308) one or more processes described herein.

Security assurance manager 302 is shown to communicate with a building information system 304. Building information system 304 may be a system separate from and/or integrated with security assurance manager 302, and may be configured to generate building information such as security asset attribute data 312 and security asset location data 314. Security asset attribute data 312 may include information related to attributes of one or more security assets located in a building (e.g., building 100). For example, security asset attribute data 312 may include a type, a manufacturing date, installation data, operating conditions, etc., of the one or more security assets. Security asset attribute data 312 may include other information that identifies, or facilitates identification of, a specific security asset within a building. Security asset location data 314 may include information specific to the location of one or more security assets located in a building. For example, security asset location data 314 may include a level of a building on which the one or more security asset are located, a type of structure to which the one or more security assets are mounted, a relative height of the one or more security assets, etc., so that an individual attempting to locate a specific security asset of the one or more security assets would be able to locate the specific security asset with little difficulty. In general, the aforementioned security assets may be any of the assets of building security system 200, described with reference to FIG. 2.

Memory 310 is further shown to include a data curator 316, a building model generator 318, an asset health monitor 320, asset service rule monitor 322, and an interface manager 326. In some embodiments, building information is received by data curator 316 from a building information system (e.g., building information system 304) of one or more buildings. Information received by data curator 316 may include information related to security asset attribute data 312 and/or security asset location data 314, as described above. Data curator 316 may analyze and transform the received data (e.g., to ensure data integrity is met) before being sent into building model generator 318. For example, data curator 316 may receive data asset attribute and location data from building information system 304 and use the received data to compile and/or generate a security asset software object or a security asset database. In another example, data curator 316 may analyze data received from building information system 304 to ensure data integrity (e.g., the data is not corrupt, the data is in a desired format).

In some embodiments, data is received from data curator 316 by building model generator 318. Building model generator 318 may generate a building model for one or more buildings based on the received information. For example, building model generator 318 may generate a building model including geographical location, size, structural information, etc., for a building (e.g., building 100). The building model may include information regarding equipment installed in the building, such as assets of a security system included in the building (e.g., building security system 200). For example, the building model may include the attributes and/or location of one or more security assets, as described with respect to building information system 304.

In some embodiments, the building model represents a layout of a building and may be generated based on a building layout (e.g., floor plan, model) or building information model uploaded by a user. A user may upload a building layout drawing, for example. For example, the building model may be a two-dimensional (2-D) representation of a building including a security system, and include a layout of the building indicating the location of various security assets of the security system within the building layout. In another example, the building model may be a 3-D representation of a building including a security system indicating the location of various security assets of the security system within the 3-D building model.

In some embodiments, the building model is sent by building model generator 318 to asset health monitor 320 and/or asset service rule monitor 322. Asset health monitor 320 may be configured analyze information regarding the security assets within the building model and monitor the health of said security assets. Asset health monitor 320 may also receive information associated with the one or more security assets of the building model from a building network communicably coupled to security assurance manager 302. For example, asset health monitor 320 may receive a current state or value, or other operating information (e.g., parameters, attributes) of the one or more security assets of the building model. In this regard, asset health monitor 320 may monitor a current and past health status of the security assets within the building model. Asset health monitor 320 may then send asset health information to interface manager 326.

Asset service rule monitor 322 may be configured to analyze the received building model and monitor one or more service rules associated with the one or more security assets of the building model. A service rule may be a predefined condition of a security asset, and the service rule may be considered broken when a certain condition is met. For example, a building may include an access door that is operable when an authorized user scans an identification badge on a card reader associated with the access door. In the event that the service door fails to open when access should be granted, a service rule associated with the access door would be considered a broken. Asset service rule monitor 322 may also receive information associated with the one or more security assets of the building model from a building network communicably coupled to security assurance manager 302. For example, asset service rule monitor may receive a current state or value, or other operating information (e.g., parameters, attributes) of the one or more security assets of the building model. In this regard, asset service rule monitor 322 may monitor adherence to one or more service rules by the security assets within the building model. Asset service rule monitor 322 may then send asset health information to interface manager 326.

In some embodiments, security assurance manager 302 may utilize information generated by asset health monitor 320 and/or asset service rule monitor 322 to determine whether a service action is required. A service action may be required when a security asset is not functioning correctly or is due for preventative maintenance, for example. In some embodiments, a service action is required when a security asset is not functioning correctly, as evidenced by one or more service rules of the security asset being broken. Based on a determination that a service action is required, security assurance manager 302 may generate a work order. The work order may allow a user to schedule a maintenance event, such as an on-site visit from a technician or a remote repair. In some embodiments, security assurance manager 302 may be configured to schedule maintenance events automatically, based on the work order.

Interface manager 326 may receive and analyze data from asset health monitor 320 and/or asset service rule monitor 322. For example, interface manager 326 may receive information regarding the health and/or service rules associated with one or more security assets. Interface manager 326 may then generate a user interface based on the health, service rules, and/or other data associated with the one or more security assets. The user interface generated by interface manager 326 may then be presented via a user device 328. User device 328 may be any device configured to display information to a user, for example, a mobile phone, desktop computer, laptop computer, tablet, or other device capable of displaying information to the user. In some embodiments, interface manager 326 may include a web application 324. Web application 324 may also present the user interface, such as via a website or webpage accessible from a network or an internet browser. For example, a user of user device 328 may access a web page associated with web application 324, to view and interact with the user interface generated by interface manager 326. In some embodiments, web application 324 utilizes HTML, JavaScript, CSS, PHP, or another web programming language to generate a web version of the user interface.

Figure 4:
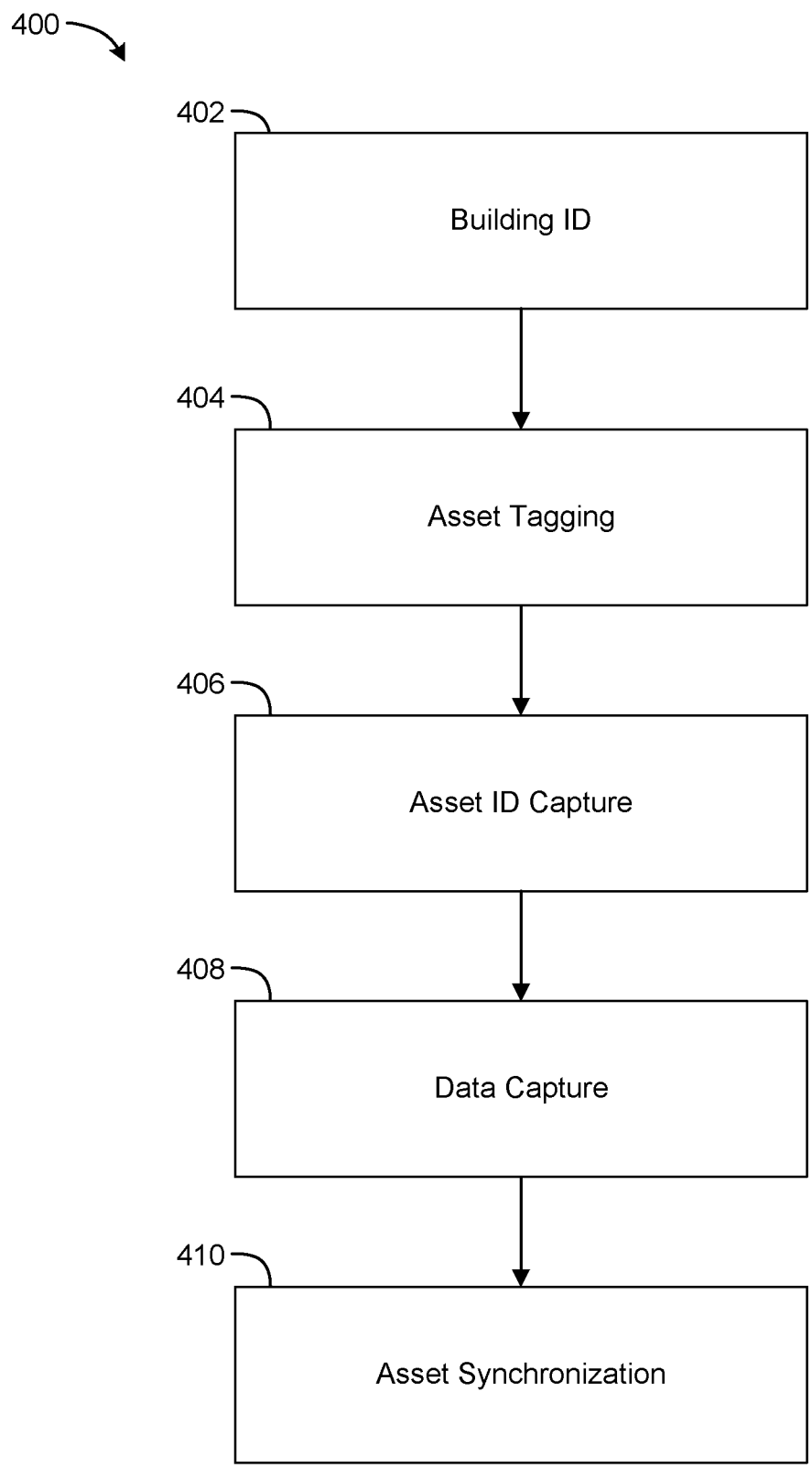
FIG. 4 is a flow diagram of a process for generating and implementing a security asset layout, according to some embodiments.

Referring now to FIG. 4, a flow diagram of a process 400 for generating and implementing a security asset layout is shown, according to some embodiments. Process 400 can be performed by security assurance manager 302, for example. Process 400 generally provides a method for identifying a building including a security system (e.g., building 100 including building security system 200), tagging and identifying one or more security assets of the security system, and updating a master database with information (e.g., location, attributes, parameters) associated with the one or more security devices. Process 400 may allow a user or manager of a security system to quickly generate a layout of a building associated with the security system, identify security assets within the security system, and locate the security assets within the layout of the building, leading to decreased troubleshooting times and increased functionality of the security system.

At step 402, a building ID is read to determine a layout of a building including a security system. In some embodiments, the security system includes security assurance manager 302. In some embodiments, a user of the security system places and/or scans a first identification (ID) tag associated with the building. The first ID tag may be a bar code, QR code, or other identification tag that identifies the building including the security system, and may be located at an entrance door or other convenient location within the building. Security assurance manager 302 may identify a building (e.g., building 100) associated with the scanned ID tag and determine that security asset information will be will be uploaded or modified for the identified building. In some embodiments, a digital layout of the building already exists within a master database associated with security assurance manager 302 or memory 310. For example, the digital layout of the building may be uploaded by a user as a building information model (BIM) or other file that includes a layout of the building. In other embodiments, a user will a prompted to upload a building layout or the user will create a digital layout of the building using any methods by which a digital layout may be created.

In step 404, a user applies asset identification (ID) tags to one or more security assets of the security system associated with the building. Much like the first ID tag, the asset ID tags may be bar codes, QR codes, or other identification tags that identify the one or more security assets of the security system. Generally the asset ID tags are located on or near their associated security assets, to allow a user to scan the asset ID tag from the location of the associated security asset at step 406. For example, a security system (e.g., building security system 200) may include ten cameras (e.g., cameras 222). A user of the security system may place an asset ID tag on each camera, so that the user might later scan the asset ID tag and to either associate the unique asset ID tag with its associated camera or to identify the camera associated with the scanned asset ID tag.

In step 406, the previously placed asset ID tags are scanned or identified by a user. As described above with respect to step 404, a user may scan an asset ID tag associated with a security asset to identify the security asset and/or input information related to the security asset, such as security asset attributes and/or locations. Such security asset attributes and/or locations may be security asset attribute data 312 and/or security asset location data 314, as described with respect to FIG. 3.

In step 408, the security assets identified at step 406 are mapped within a digital layout of the building. Mapping the location of the security assets may allow a user to visualize the layout of the building and quickly determine the location of one or more security assets within the building. The security assets may be mapped within a 2D or 3D model of the building, and a building model may be generated by building model generator 318 that includes the locations of the security assets. Additionally, the user may be allowed to select a specific security asset and view information relating to the security asset and/or modify the security asset's location or information. The user may also be able to add or delete security assets from the building model. As described above, with respect to FIG. 3, security asset information, such as the location, attributes, and identity of the security assets, may be analyzed or transformed by data curator 316 prior to mapping (i.e., generating the building model). Data curator 316 may analyze data prior to sending to building model generator 318 to ensure integrity of the data.

As described above, security assurance manager 302 may be implemented in a single building or across multiple buildings, to track the health, attributes, and performance of security assets within each building. In other embodiments, there may be multiple of security assurance manager 302, configured to monitor security assets throughout any number of buildings. Therefore, at step 410, security asset data is synchronized with a master database. To accurately communicate the status of the security assets from multiple buildings and/or multiple of security assurance manager 302, the security asset data associated with each building may be synchronized with the master database, such that the master database includes information relating to the security assets of all buildings being monitored. As such, in some embodiments, security assurance manager 302 can communicate with a master database via a wired or wireless connection. In some embodiments, the master database is implemented via a local server, a remote server, a cloud server, or via another method or system.

Figure 5:
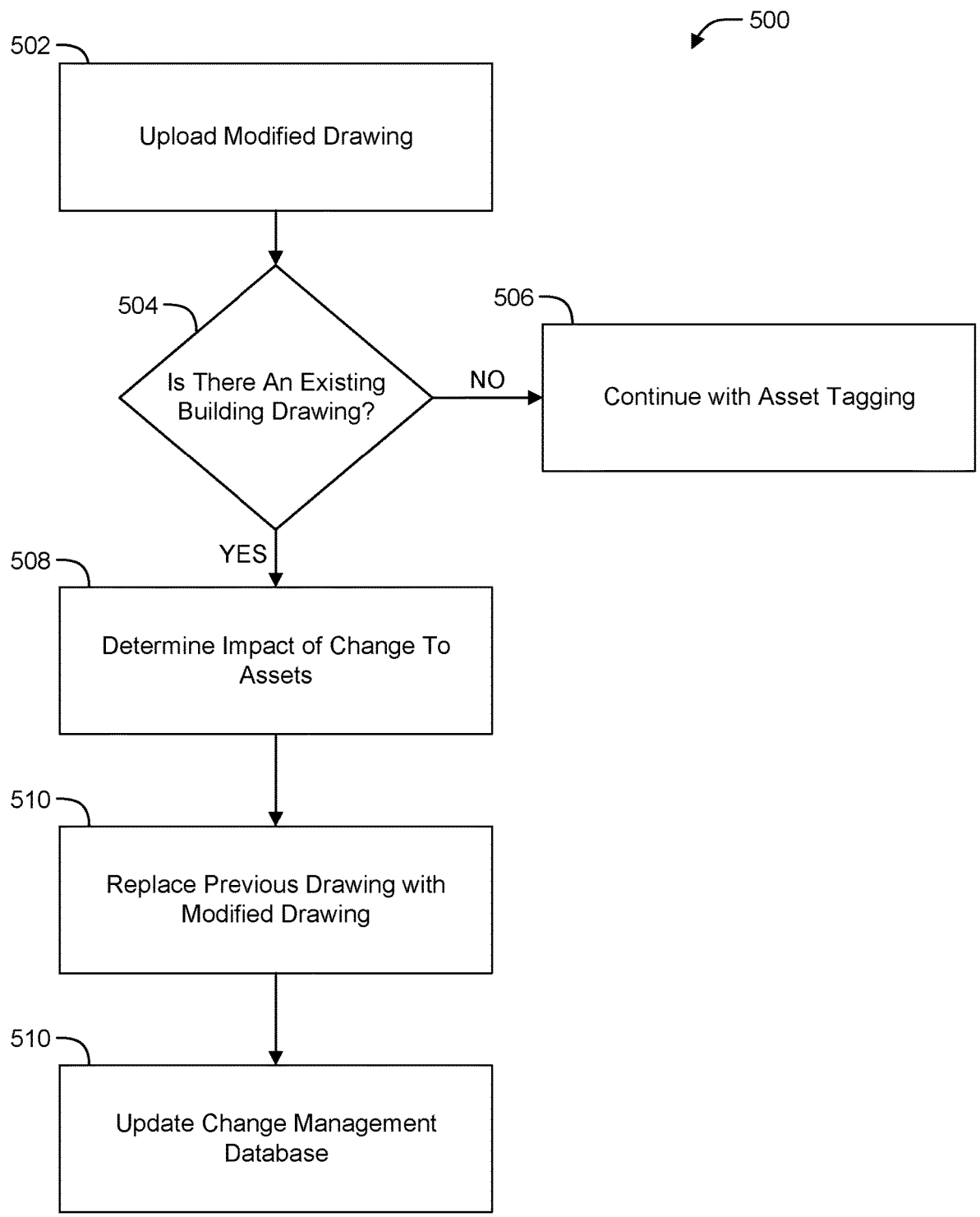
FIG. 5 is a flow diagram of a process for updating and implementing a security asset layout, according to some embodiments.

Referring now to FIG. 5, a flow diagram of a process 500 for updating and implementing a security asset layout is shown, according to some embodiments. Process 500 can be performed by security assurance manager 302, for example. Process 500 generally provides a method for uploading a modified drawing of a building layout of a building and determining an impact of change to security assets of the building. Process 500 may allow a user or manager of a security system to upload a new or modified drawing defining a layout of a building associated with a security system and update the location of one or more security assets within the modified layout of the building, thereby ensuring accurate location data for the one or more security assets.

In step 502, a modified building drawing is uploaded by a user (e.g., a user of security assurance manager 302). The modified building drawing may be a drawing of a layout of a building that includes a security system (e.g., building 100 including building security system 200) that defines a layout of the building. The modified building drawing may be an updated version of an original building drawing, where on or more attributes or parameters of the building layout have changed. For example, the layout of a building may be modified if the building is renovated or has suffered damage (e.g., from a fire). If the layout of the building has been changed, and a modified drawing defining a new layout of the building is not uploaded (e.g., to security assurance manager 302), the location of one or more security assets of the security system may be inaccurate, potentially leading to security issues.

At step 504, a determination is made on whether there is an existing drawing of the building. For example, after a modified drawing is uploaded, security assurance manager 302 may determine whether a drawing or digital layout exists within a database (e.g., a master database of security assurance manager 302). If an existing drawing or digital layout for the building is not identified (i.e., the uploaded drawing is new, and not a modification of an existing drawing), security assurance manager 302 may prompt the user to continue with the tagging of security assets (step 506), such as in step 404 of FIG. 4. However, an existing drawing or digital layout for the building is identified (i.e., the uploaded drawing is a modification of an existing drawing), a user may be prompted (e.g., via user device 328) to determine an impact to the location of one or more security assets.

At step 508, a user determines the impact of the modified drawing to the one or more security assets. The user may review a new building model, generated based on the modified drawing, to determine the location of the one or more security assets. The user must account for each of the one or more security assets so that security assurance manager 302 may accurately track and monitor the security assets. For example, a user may be presented with a new building model for a renovated building, and determine that the location data of one or more security assets places these security assets within a now nonexistent portion of the building (e.g., due to demolition of a section of the building). In this example, a user may relocate the one or more security assets to a new location within the building, following a prompt to determine the impact of the new building layout due to the modified drawing. In so doing, the user can ensure that security assurance manager 302 retains, and therefore presents via user device 328, digital layouts of the building that accurately locate the one or more security assets.

At step 510, the original building drawing is replaced with the modified drawing. As described above, the modified building drawing may be used to generate a new digital layout or building model, identifying update security asset locations. Replacing an outdated or otherwise incorrect drawing allows security assurance manager 302 to present the most accurate location information to a user. At step 512, the modified drawing, digital layout, and/or building model can then be used to update a change management database. The change management database may include a historical archive of changes made to the security system(s) associated with security assurance manager 302. Maintaining the change management database may allow a user to view and record changes to a security system over time, and ensures accurate records are kept of the layout of the building and the locations of various security assets associated with the building.

Figure 6:
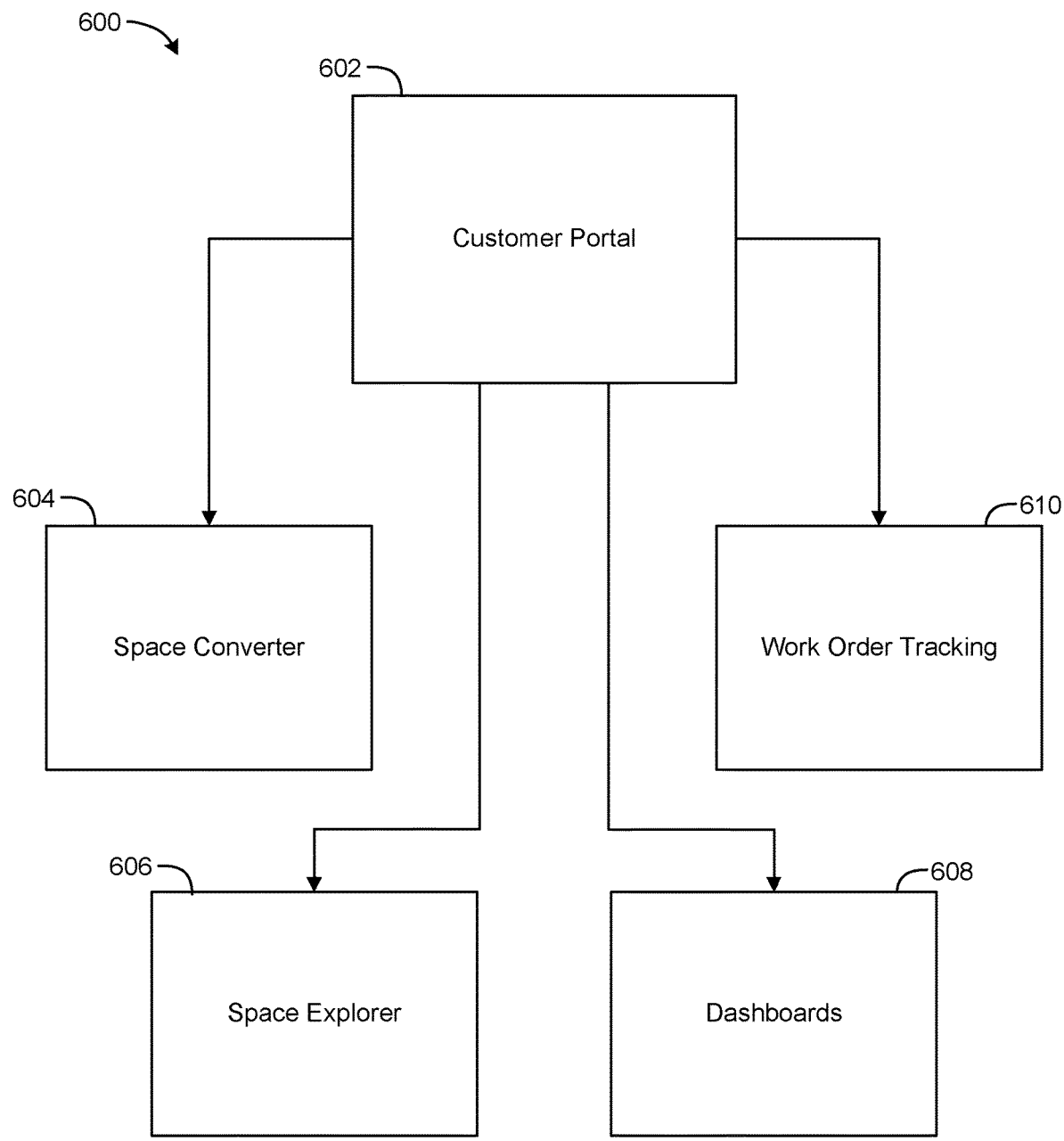
FIG. 6 is a block diagram of a user interface of the security assurance system of FIG. 3, according to some embodiments.

Referring now to FIG. 6, a block diagram of a user interface 600 of the security assurance system of FIG. 3 is shown, according to some embodiments. User interface 600 is shown to include a customer portal 602, a space converter 604, a space explorer 606, dashboards 608, and work order tracking 610. User interface 600 may be generated by interface manager 326 of security assurance manager 302, and may be presented via user device 328. In some embodiments, user interface 600 may be presented via a website or webpage accessible from a network or an internet browser, such as the website or webpage created by web application 324, as described above.

Customer portal 602 may represent a landing page for a user of security assurance manager 302. Customer portal 602 may be the first page or interface presented to the user when interacting with security assurance manager 302, such as by user device 328. For example, when a user accesses a website generated by web application 324, the user may be presented with customer portal 602. Customer portal 602 may present a variety of information relating to security systems of one or more buildings associated with the user. For example, the user may manage security systems for multiple buildings, and information associated with each building may be presented on customer portal 602. From customer portal 602, a user may choose to access the space converter 604, the space explorer 606, the dashboards 608, or the work order tracking 610, among other interfaces or information.

In some embodiments, space converter 604 is an interface where drawing files for a building may be uploaded, to be analyzed by data curator 316 and used to generate a building model by building model generator 318, for example. Space converter 604 will be further described with reference to FIG. 7, below.

In some embodiments, space explorer 606 is a mapping application that allows a user to place security assets within a building. For example, a user may place one or more assets of building security system 200 within a digital layout of building 100. The user may place security assets within a digital layout of building model generated by building model generator 318, for example. The space explorer 606 may also present the digital layout and/or building model associated with a building, and further present security asset location and/or attributes data. For example, space explorer 606 may present a digital layout of a building with symbols indicating a location of one or more security assets within the digital layout. Space explorer 606 may also provide a method for a user to filter security assets, such as by type or location, for example.

In some embodiments, dashboards 608 include one or more applications that allow a user to view information associated with the security assets. Information included within dashboards 608 may include a breakdown (i.e., a summary) of all security assets with a building and any monitoring events that may have occurred. For example, a dashboard of dashboards 608 may include security asset attribute data, a textual representation of security asset locations, current security asset statuses, etc. In some embodiments, information included within dashboards 608 includes a log of any service operations from any of the security assets. In some embodiments, information included within dashboards 608 includes a report of the compliance of security assets. Dashboards 608 will be further described with reference to FIGS. 8-10.

In some embodiments, work order tracking 610 is an application that can automatically track work orders when one or more security assets are not functioning correctly, or when one or more security assets are due for routine maintenance activities. Work orders may be generated by security assurance manager 302 based on data from asset health monitor 320 and/or asset service rule monitor 322. Once a work order is generated, it may be present to a user via work order tracking 610, allowing the user to view, track, and otherwise monitor active and close work orders. Additionally, work orders presented via work order tracking a master database associated with security assurance manager 302 such that the history and compliance of work orders can be tracked.

Referring now to FIG. 7 an example user interface 700 that illustrates space converter 604 is shown, according to some embodiments. A user navigating to space converter 604 from customer portal 602 may be presented with interface 700, for example. Interface 700 is shown to include a building name 702, a location 704, an address 706, a number of floors 708, and a status 710 for each of a plurality of buildings. The plurality of buildings may represent a plurality of buildings being managed by a user of security assurance manager 302 or another user of another security assurance system. In one embodiment, the user that is presented with interface 700 may update one or more pieces of information presented via interface 700. For example, a user may update one of the building name 702, location 704, address 706, or number of floors 708. In some embodiments, the user may utilize interface 700 to monitor statuses of one or more buildings, thereby reducing the number of interfaces the user must navigate to in order to view information associated with multiple buildings.

As described above, a user may upload (e.g., to security assurance manager 302) a new or modified building drawing, defining a layout or model of a building. Interface 700 may notify the user to a status of a building model being generated by building model generator 318. For example, a user may enter a building name 702, location 704, address 706, and a number of floors 708, but not a drawing file. Status 710 may notify the user that a drawing file has not been uploaded for one or more buildings, prompting the user to upload a drawing. After the user uploads the drawing of the building (e.g., to security assurance manager 302), status 710 may notify the user that the drawing file(s) have been uploaded. Once the drawing file(s) have been analyzed by data curator 316, status 710 may notify the user that a conversion of the file is complete. Finally, status 710 may notify the user that a building model generated by building model generator 318 complete and ready for viewing.

Figure 8:
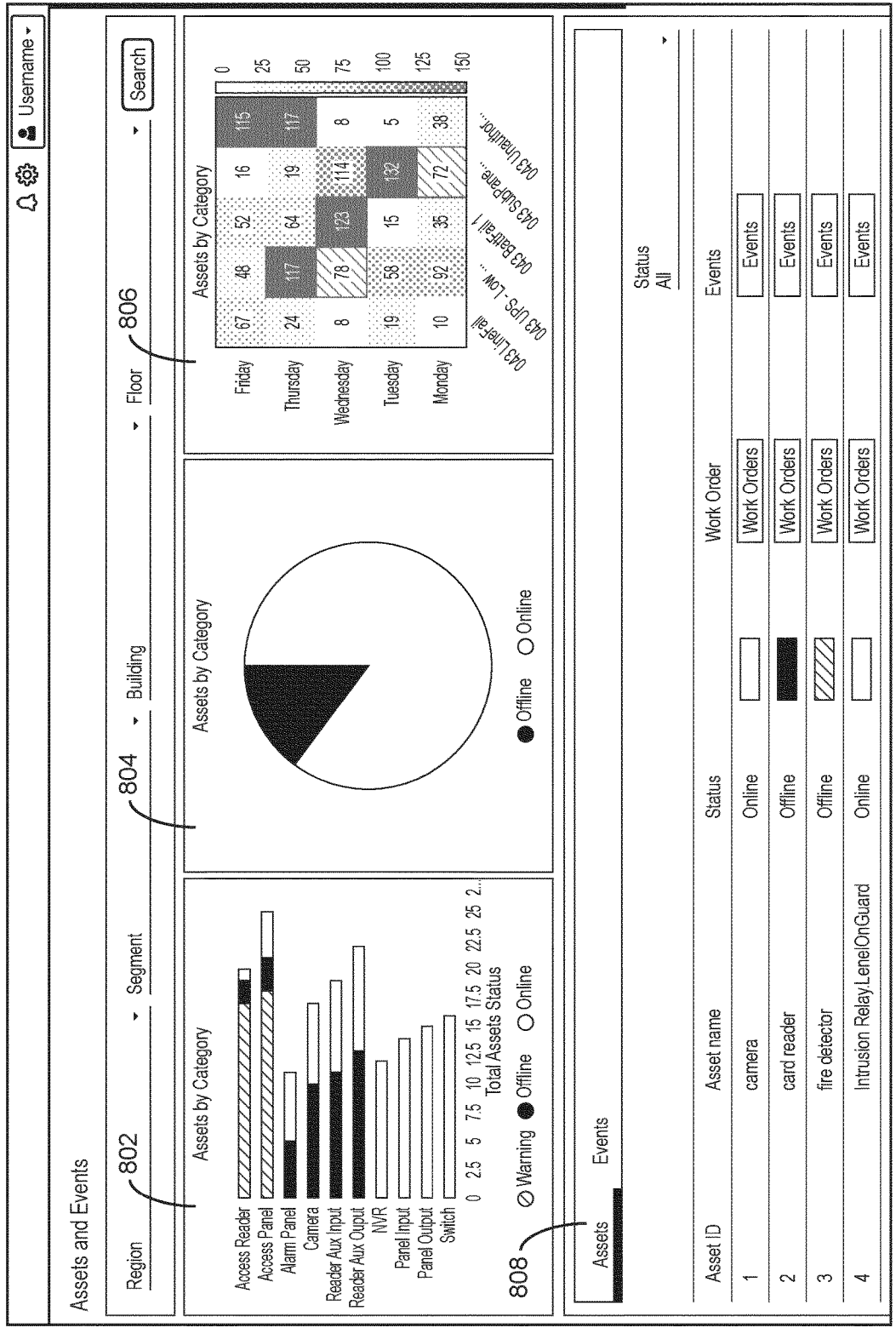
FIG. 8 is an example user interface illustrating one of the dashboards of FIG. 6, according to some embodiments.

Referring now to FIG. 8, an example user interface illustrating an asset monitoring dashboard 800 is shown, according to some embodiments. A user navigating to one of the dashboards 608 from customer portal 602 may be presented with asset monitoring dashboard 800, for example. Asset monitoring dashboard 800 is shown to include an asset category 802, an asset status 804, asset events 806, and asset overview 808. Asset monitoring dashboard 800 may allow a user to monitor overall health of the security assets associated with a building to determine if any actions should be taken.

Asset category 802 may include a listing of all security assets in a building and a count of each type of security asset that is online, offline, or has a warning associated with it. A security asset that is online can be monitored by security assurance manager 302, but a security asset that is not online cannot be monitored by security assurance manager 302, for example. Asset status 804 may include graph illustrating an overall percentage of security assets that are online or offline. Asset events 806 illustrates a listing of events (e.g., alarm events, service rule events, etc.) and a day on which each even occurred. Asset events 806 may be useful in determining event trends among security assets (e.g., a certain fault repeatedly occurring on a specific day). Asset overview 808 provides the user with a detailed view of each of the security assets. With asset overview 808, the user is able to view an asset ID, an asset name, and an asset status (e.g., online, offline, warning). Additionally, a user may view work order and/or event associated with each security asset.

Figure 9:
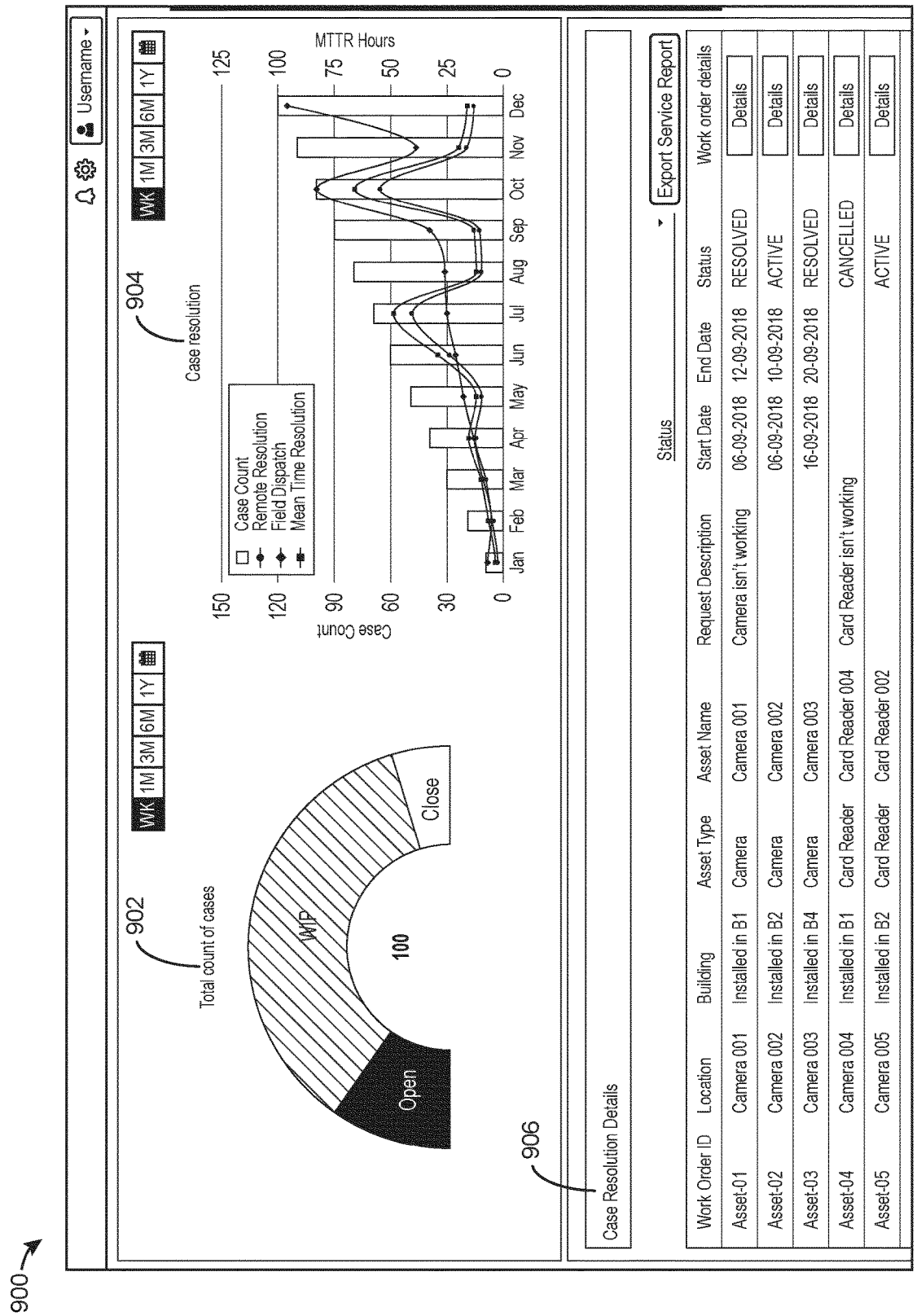
FIG. 9 is an example user interface illustrating another one of the dashboards of FIG. 6, according to some embodiments.

Referring now to FIG. 9, an example user interface illustrating an asset service dashboard 900 is shown, according to some embodiments. A user navigating to one of the dashboards 608 from customer portal 602 may be presented with asset service dashboard 900, for example. Asset service dashboard 900 may provide a user with overview of the service status of a plurality of security assets. With asset service dashboard 900, a user may view overall service status of the security assets associated with a building to determine if any actions should be taken.

Asset service dashboard 900 is shown to include a total count of cases 902, a case resolution chart 904, and case resolution details 906. Count of cases 902 may include an overview of a total number of security service events that have occurred and an indication that the service events are open, closed, or in process. Case resolution chart 904 may include a graph illustrating a number of service cases for each month and a variety of other information associated with the service cases including a mean time to resolution, and whether the resolution was reached remotely or required a field service technician dispatch. Case resolution details 906 may include a detailed view of the service status of each security asset associated with the building. For example, case resolution details 906 may include information such as the specific security asset, the location of the security asset, the type of security asset, the specific service issue identified (e.g., by asset service rule monitor 322), an indication where the service issue has been resolved, and the start/end dates of the security asset issue.

Figure 10:
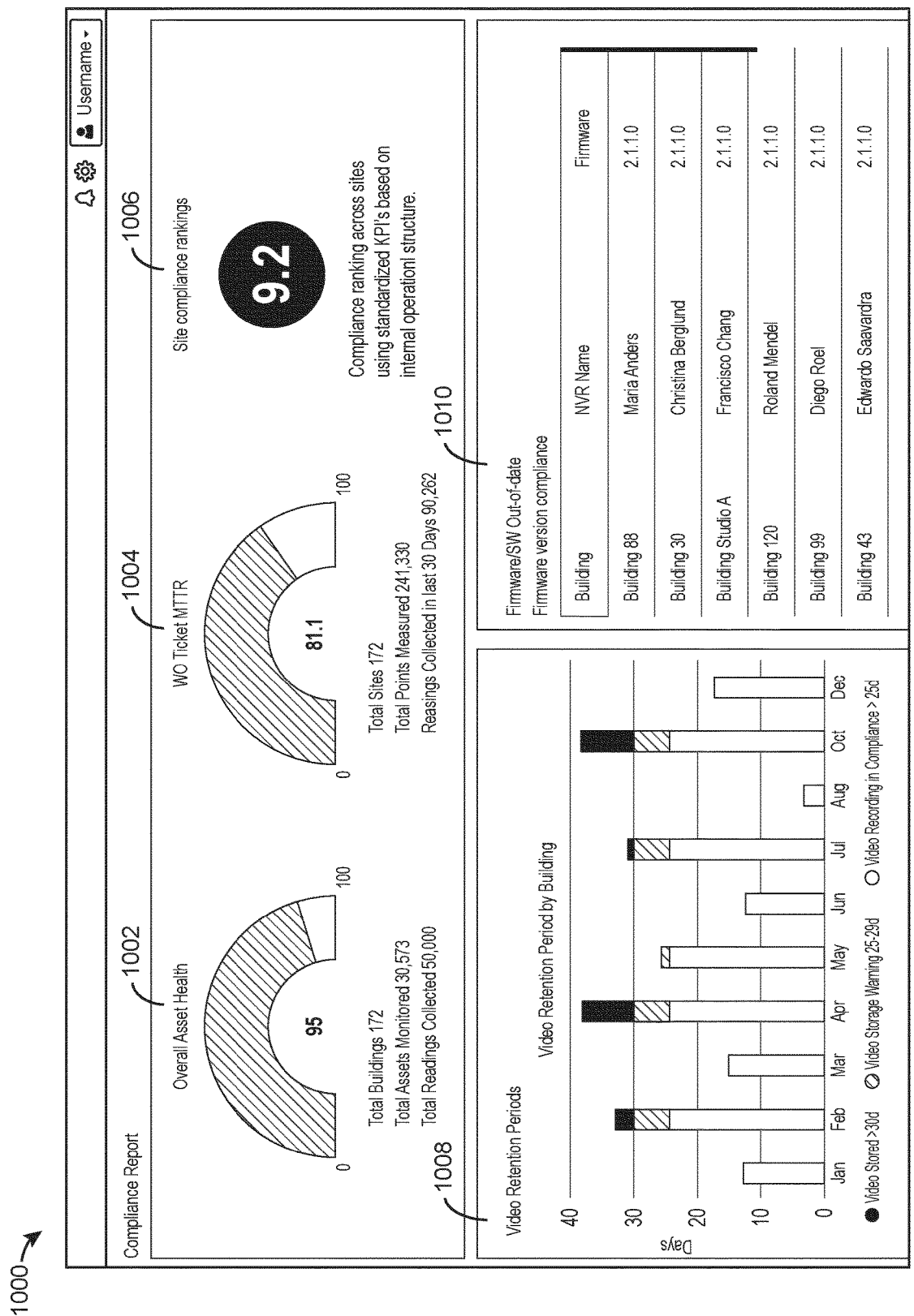
FIG. 10 is an example user interface illustrating yet another one of the dashboards of FIG. 6, according to some embodiments.

Referring now to FIG. 10, an example user interface illustrating an asset compliance dashboard 1000 is shown, according to some embodiments. A user navigating to one of the dashboards 608 from customer portal 602 may be presented with asset compliance dashboard 1000, for example. Asset compliance dashboard 1000 may be configured to notify a user as to a regulatory compliance status of each of a plurality of security assets. Asset compliance dashboard 1000 is shown to include an overall asset health 1002, a work order ticket metric 1004, an overall site compliance ranking 1006, video retention periods 1008, and firmware notifications 1010.

Overall asset health 1002 includes an overview of all security assets and an overall regulatory compliance status of all the security assets. For example, overall asset health 1002 may include a graph, as shown in FIG. 10, that illustrates a percentage number of security assets that are functioning correctly (e.g., without faults) based on a total number of assets monitored and a total number of readings collected. Work order ticket metric 1004 provides an overview of the status of the compliance work orders across the security assets, illustrating to a user a number of compliance work orders that are open, and how many have been addressed. For example, work order ticket metric 1004 may include a graph, as shown in FIG. 10, which illustrates a percentage of work order tickets that have been addressed. Overall site compliance ranking 1006 provides a user with a single metric illustrating a level of regulatory compliance of a security system including the security assets (e.g., security system). For example, overall site compliance ranking 1006 may be a score out of ten (e.g., 9.2 out of 10) illustrating an overall site compliance in a single metric.

Still referring to FIG. 10, video retention periods 1008 may provide a breakdown of video retention periods across the security assets. In some embodiments, video retention periods may vary across types and/or geographical locations of security. As such, it is important for a user to monitor security assets for non-compliance with current regulatory standards. From the information presented in video retention periods 1008, the user can make decisions relating to the management and operations of a security system including the security assets, such that the security assets are brought into compliance. Firmware notifications 1010 may provide an overview of firmware updates across the security assets. Regular firmware updates may be necessary for the security assets to maintain compliance, as well as maintaining security asset functionality.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with

What is claimed is:

1. A security assurance system for a building comprising one or more security assets, the system comprising:
one or more memory devices having instructions stored thereon that, when executed by one or more processors, cause the one or more processors to perform operations comprising:
generating a three-dimensional (3D) model of the building based on a layout model of the building and location data of the one or more security assets within the building, wherein generating the 3D model of the building comprises mapping the location data of the one or more security assets to corresponding locations within the 3D model of the building, the 3D model generated such that the one or more security assets are included in the 3D model at relative heights within corresponding floors of the building as indicated by the location data;
monitoring a status of a service action of the one or more security assets based on one or more predefined operating conditions for the one or more security assets; and
presenting, via a user interface, the status of the service action of the one or more security assets and the location data, the location data presented within the 3D model of the building.

2. The security assurance system of claim 1, wherein the one or more security assets are monitored to determine that the one or more security assets are in compliance with one or more regulatory standards.

3. The security assurance system of claim 1, the operations further comprising:
receiving first data indicating the layout model of the building; and
generating the 3D model of the building responsive to receiving the first data.

4. The security assurance system of claim 1, the operations further comprising receiving second data indicating the location data of the one or more security assets within the building.

5. The security assurance system of claim 4, wherein the second data is received in response to a user scanning asset identification tags associated with the one or more security assets.

6. The security assurance system of claim 1, the operations further comprising:
determining whether to perform a second service action for a first security asset of the one or more security assets based on the status of the service action of the first security asset; and
generating a work order for the first security asset based on a determination to perform the second service action.

7. The security assurance system of claim 6, wherein determining whether to perform the second service action comprises determining that a service rule has been broken.

8. The security assurance system of claim 6, wherein determining whether to perform the second service action comprises determining that at least one security asset of the one or more security assets is not in compliance with one or more regulatory standards.

9. The security assurance system of claim 1, the operations further comprising presenting, via the user interface, the one or more security assets within the 3D model of the building.

10. The security assurance system of claim 1, the operations further comprising presenting, via the user interface, an asset monitoring dashboard indicating the status of the service action of the one or more security assets.

11. A method for a building comprising one or more security assets, the method comprising:
generating, by one or more processors coupled to memory, a three-dimensional (3D) model of the building based on a layout model of the building and location data of the one or more security assets within the building, wherein generating the 3D model of the building comprises mapping the location data of the one or more security assets to corresponding locations within the 3D model of the building, the 3D model generated such that the one or more security assets are included in the 3D model at relative heights within corresponding floors of the building as indicated by the location data;
monitoring, by the one or more processors, a status of a service action of the one or more security assets based on one or more predefined operating conditions for the one or more security assets; and
presenting, by the one or more processors, via a user interface, the status of the service action of the one or more security assets and the location data, the location data presented within the 3D model of the building.

12. The method of claim 11, wherein the one or more security assets are monitored to determine that the one or more security assets are in compliance with one or more regulatory standards.

13. The method of claim 11, further comprising:
receiving, by the one or more processors, first data indicating the layout model of the building; and
generating, by the one or more processors, the 3D model of the building responsive to receiving the first data.

14. The method of claim 11, further comprising receiving, by the one or more processors, second data indicating the location data of the one or more security assets within the building.

15. The method of claim 14, wherein the second data is received in response to a user scanning asset identification tags associated with the one or more security assets.

16. The method of claim 11, further comprising:
determining, by the one or more processors, whether to perform a second service action for a first security asset of the one or more security assets based on the status of the service action of the first security asset; and
generating, by the one or more processors, a work order for the first security asset based on a determination to perform the second service action.

17. The method of claim 16, wherein determining whether to perform the second service action comprises determining, by the one or more processors, that a service rule has been broken.

18. The method of claim 16, wherein determining whether to perform the second service action comprises determining, by the one or more processors, that at least one security asset of the one or more security assets is not in compliance with one or more regulatory standards.

19. The method of claim 11, further comprising presenting, via the user interface, the one or more security assets within the 3D model of the building.

20. The method of claim 11, further comprising presenting, by the one or more processors, via the user interface, an asset monitoring dashboard indicating the status of the service action of the one or more security assets.

* * * * *